United States Patent [19]
Miazga et al.

[11] Patent Number: 4,499,581
[45] Date of Patent: Feb. 12, 1985

[54] SELF TESTING SYSTEM FOR REPRODUCTION MACHINE

[75] Inventors: Dennis E. Miazga, Fairport; Tuan A. Nguyen, Webster; Michael T. Dugan, Fairport, all of N.Y.

[73] Assignee: Xerox Corporation, Stamford, Conn.

[21] Appl. No.: 420,967

[22] Filed: Sep. 21, 1982

[51] Int. Cl.³ .............................................. G06F 11/00
[52] U.S. Cl. ...................................... 371/20; 364/200; 371/16
[58] Field of Search .................. 371/20, 16; 355/14 C; 364/200, 900

[56] References Cited

U.S. PATENT DOCUMENTS 4,162,396  7/1979  Howard et al. ..................... 371/20
4,322,846  3/1982  Carroll et al. ..................... 371/16

Primary Examiner—Charles E. Atkinson
Attorney, Agent, or Firm—Frederick E. McMullen

[57] ABSTRACT

A reproduction machine incorporating self test routines to test the machine operating logic, particularly at start up, to insure the integrity and operability of the component parts of the operating logic. The tests include routines for initially checking the machine master control module logic and memory. A display panel on the master control module visually identifies any fault in the event the communication link to the machine main display has failed. Once the operability of the master control module is established, self tests of the various machine remote control modules are carried out followed by a test of the communication channel between all modules. Any fault found is visually identified to facilitate repair and servicing.

5 Claims, 11 Drawing Figures

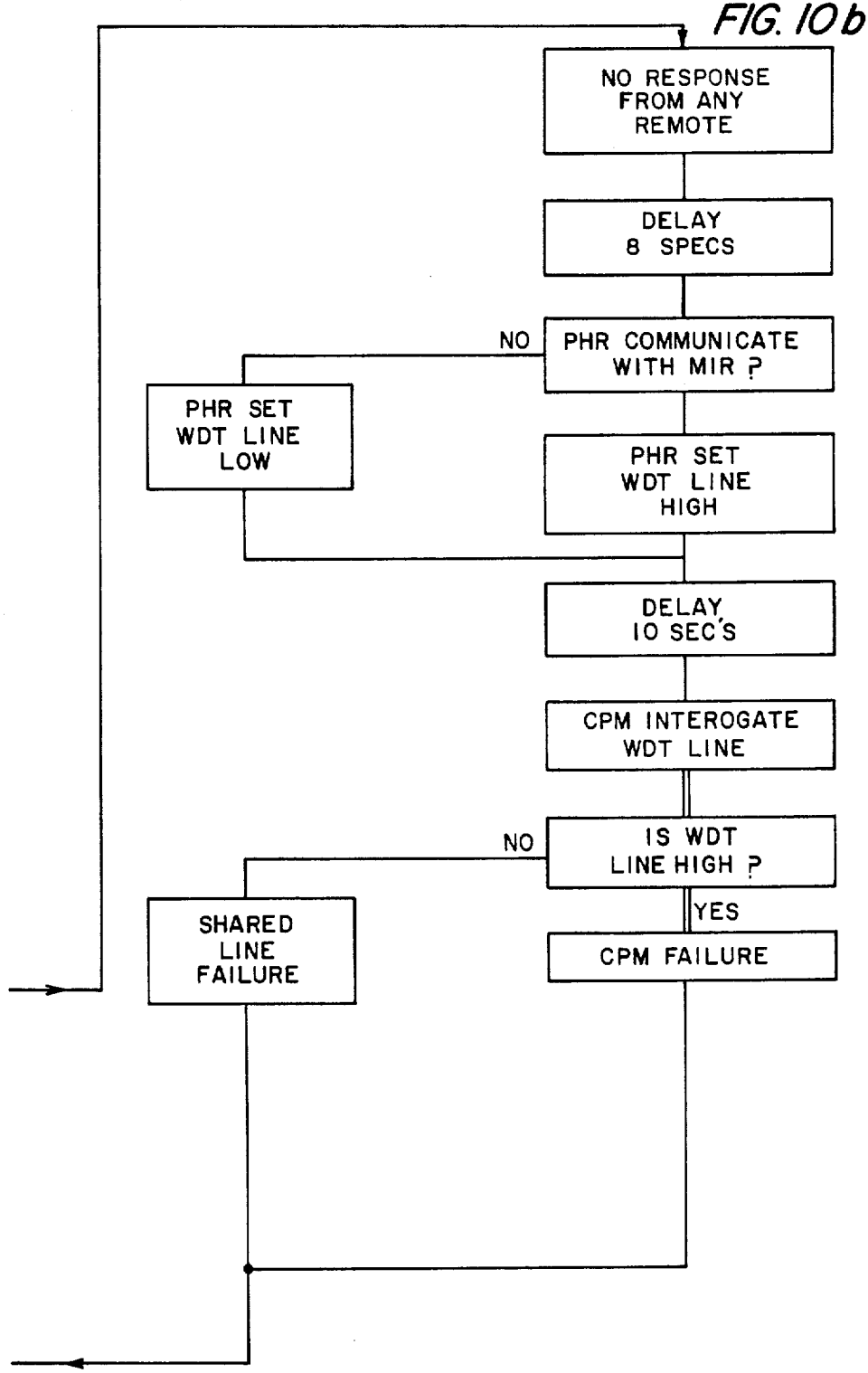

SELF TESTING SYSTEM FOR REPRODUCTION MACHINE

The invention relates to a reproduction machine and more particularly to a system for verifying the operability of the machine electronics.

Modern day high speed copiers normally enable a multiplicity of copy operations such as simplex copying, duplex copying, sorting, finishing, automatic document handling, etc. This, of course, entails a multitude of copy processing components with sophisticated electronic systems to realize not only the various operations and functions but to do so at high speeds with the highest copy quality and the least interruption. As a result, the electronics systems are expensive and normally includes both ROM and RAM operating memories, non-volatile memory for permanently storing critical machine operating parameters, control circuits for operating the myriad of components that make up the reproduction machine in accordance with operator instructions and data, data communication links enabling information and instructions to be passed among the various machine control modules, etc.

It is therefore desirable to determine, at least before the reproduction machine starts to produce copies, the operating status of these various memories, circuits, communication links, etc. Otherwise, serious and possibly damaging machine malfunctions and jams may occur.

The invention relates to the process of checking the operability of the main controller and plural remote controllers of a reproduction machine coupled together by a shared communication line through which instructions and information between the controllers is transmitted, the steps which comprise: individually testing the operating integrity of the main controller and the remote controllers; polling the remote controllers when testing of all the controllers is completed to identify to the main controller any failed remote controller; repeating testing of the controllers in the event one of the controllers failed at least once before; and inhibiting operation of the reproduction machine in response to one of the controllers failing when testing of the controllers is repeated.

IN THE DRAWINGS

FIGS. 10a and 10b are flow charts of the self test routines.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
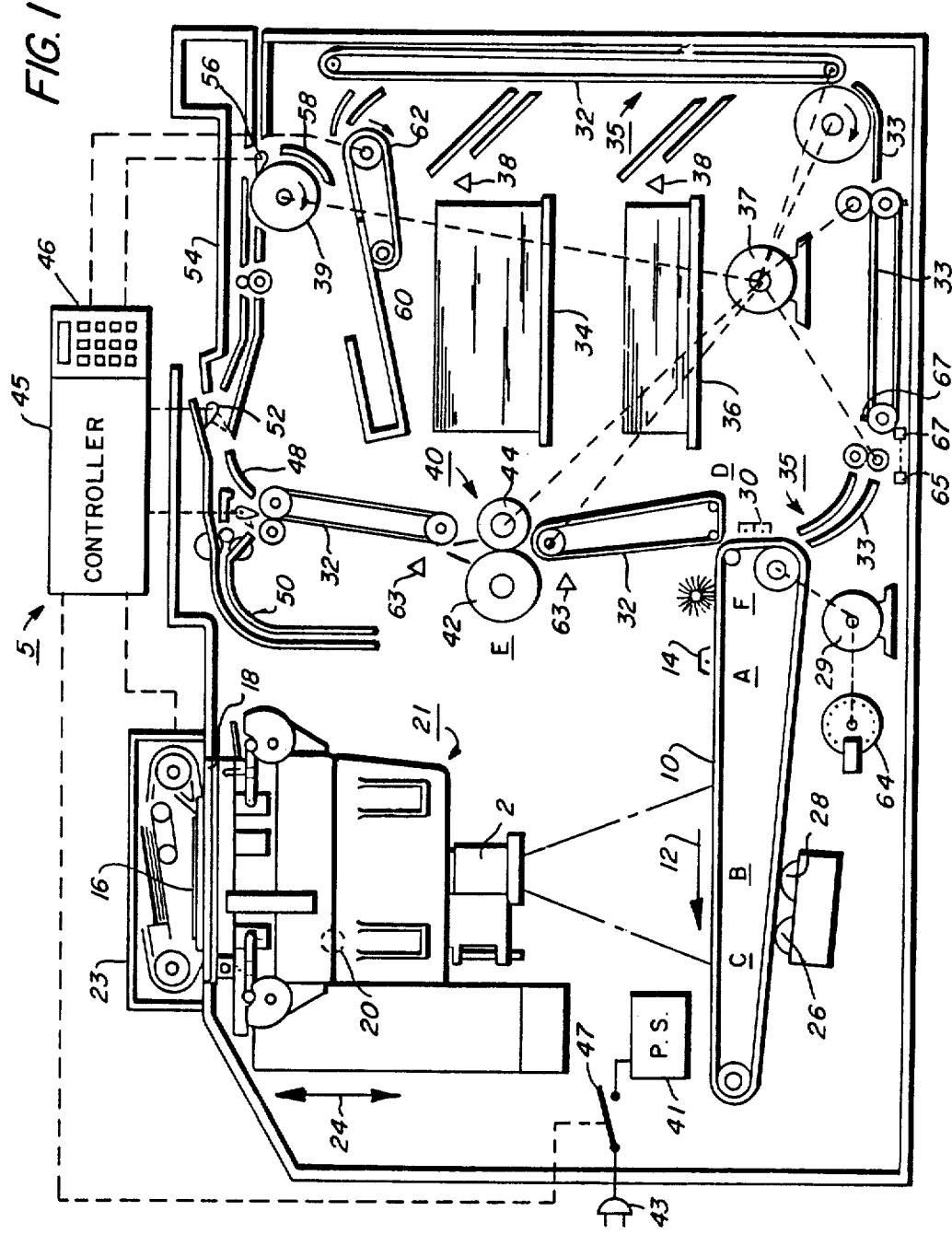
FIG. 1 is a plan view of a reproduction machine incorporating the self testing system of the present invention.

For a general understanding of the features of the present invention, reference is had to the drawings. In the drawings, like reference numerals have been used throughout to designate identical elements. FIG. 1 schematically depicts the various components of an illustrative electrophotographic printing machine 5 incorporating the system of the present invention therein. It will become evident from the following discussion that the invention is equally well suited for use in a wide variety of printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a belt 10 having a photoconductive surface thereon. Preferably, the photoconductive surface is made from a selenium alloy. Belt 10 moves in the direction of arrow 12 to advance successive portions of the photoconductive surface through the various processing stations disposed about the path of movement thereof.

Initially, a portion of the photoconductive surface passes through charging station A. At charging station A, a corona generating device, indicated generally by the reference numeral 14, charges the photoconductive surface to a relatively high substantially uniform potential.

Next, the charged portion of the photoconductive surface is advanced through imaging station B. At imaging station B, a document handling unit, indicated generally by the reference numeral 23, positions original documents 16 facedown over exposure system 21. The exposure system, indicated generally by reference numeral 21 includes lamp 20 which illuminates the document 16 positioned on transparent platen 18. The light rays reflected from document 16 are transmitted through lens 22. Lens 22 focuses the light image of original document 16 onto the charged portion of the photoconductive surface of belt 10 to selectively dissipate the charge thereof. This records an electrostatic latent image on the photoconductive surface which corresponds to the informational areas contained within the original document. Thereafter, belt 10 advances the electrostatic latent image recorded on the photoconductive surface to development station C. Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 23 sequentially feeds documents from a stack of documents placed by the operator in a normal forward collated order in a document stacking and holding tray. The documents are fed from the holding tray, in seriatim, to platen 18. The document handling unit recirculates documents back to the stack supported on the tray. Preferably, the document handing unit is adapted to serially sequentially feed the documents, which may be of various sizes and weights of paper or plastic containing information to be copied. The size of the original document disposed in the holding tray and the size of the copy sheet are measured. Preferably, magnification of the imaging system is adjusted to insure that the indicia or information contained on the original document is reproduced within the space of the copy sheet.

While a document handling unit has been described, one skilled in the art will appreciate that the original document may be manually placed on the platen rather than by the document handling unit. This is required for a printing machine which does not include a document handling unit.

A plurality of sheet transports 32 and sheet guides 33 cooperate to form a paper path 35 through which the copy sheets being processed pass from either main paper supply tray 34, or auxiliary paper supply tray 36, or duplex paper supply tray 60 through the machine 5 to either output tray 54 or discharge path 58. Transports 32 are driven by motor 37. Suitable sheet sensors designated here by the numeral 38, are provided at the output of each paper tray 34,36 and duplex tray 60 to detect feeding of a sheet therefrom.

With continued reference to FIG. 1, at development station C, a pair of magnetic brush developer rollers, indicated generally by the reference numerals 26 and 28, advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to transfer station D. At transfer station D, a copy sheet is moved into transfer relation with the toner powder image. Transfer station D includes a corona generating device 30 which sprays ions onto the backside of the copy sheet. This attracts the toner powder image from the photoconductive surface of belt 10 to the sheet. After transfer, the sheet is advanced to fusing station E.

Fusing station E includes a fuser assembly, indicated generally by the reference numeral 40, which permanently affixes the transferred powder image to the copy sheet. Preferably, fuser assembly 40 includes a heated fuser roller 42 and backup roller 44. The sheet passes between fuser roller 42 and backup roller 44 with the powder image contacting fuser roller 42. In this manner, the powder image is permanently affixed to the sheet.

After fusing, the sheet is transported to gate 48 which functions as an inverter selector. Depending upon the position of gate 48, the copy sheets will either be deflected into a sheet inverter 50 or bypass sheet inverter 50 and be fed directly onto a second decision gate 52. Thus, copy sheets which bypass inverter 50 turn a 90° corner in the paper path before reaching gate 52. Gate 52 inverts the sheets into a faceup orientation so that the imaged side which has been transferred and fused is faceup. If inverter path 50 is selected, the opposite is true, i.e. the last printed face is facedown. Second decision gate 52 deflects the sheet directly into an output tray 54 or deflects the sheet into a path which carries the sheet to a third decision gate 56. Gate 56 either passes the sheets directly on without inversion to the copier or routes the sheets to a duplex inverter roll 39. Inverting roll 39 inverts and stacks the sheets to be duplexed in a duplex tray 60 when gate 56 so directs. Duplex tray 60 provides intermediate or buffer storage for those sheets which have been printed on one side and on which an image will be subsequently printed on the side opposed thereto, i.e. the copy sheets being duplexed. Due to the sheet inverting action of roll 39, the buffer set sheets are stacked in duplex tray 60 facedown in the order in which the sheets have been copied.

In order to complete duplex copying, the previously simplexed sheets in tray 60 are fed seriatim by bottom feeder 62 back into the paper path 35 and transfer station D for transfer of the toner powder image to the opposed side of the sheet. Movement of the sheet along the paper path produces an inversion thereof. However, inasmuch as the bottommost sheet is fed from duplex tray 60, the proper or clean side of the copy sheet is positioned in contact with belt 10 at transfer station D so that the toner powder image thereon is transferred thereto. The duplex sheets are then fed through the same path as the previously simplexed sheets to be stacked in tray 54 for subsequent removal by the printing machine operator. In order to operate reproduction machine 5 and drive the various components thereof, suitable power supplies including a low voltage power supply 41 (i.e. 24 volts) are provided as will be understood by those skilled in the art. Power outlet cord 43 couples the machine power supplies through power on/off switch 47 to a suitable power source.

Figure 2:
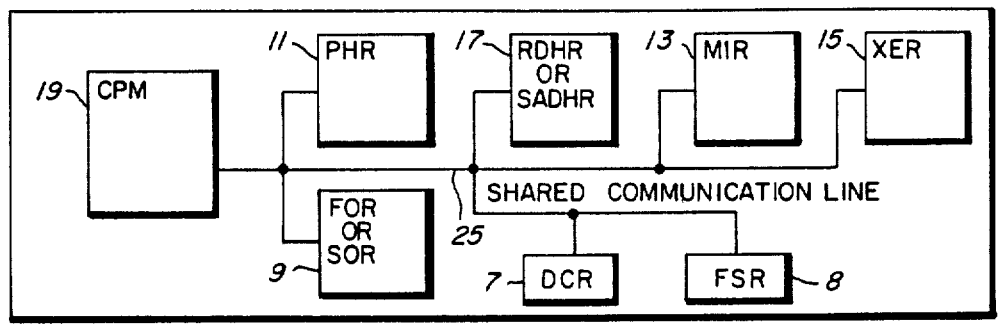
FIG. 2 is a schematic view illustrating the control modules and shared communication channel arrangement of the reproduction machine shown in FIG. 1.

Referring particularly to FIG. 2, reproduction machine 5 is segregated into a main controller module, identified as central processing master or CPM 19, and a plurality of sub controller modules (termed remotes herein), and identified as the display control remote (DCR) 7, foreign servo remote (FSR) 8, finishing output remote (FOR) 9, paper handling remote (PHR) 11, marking an imaging remote (MIR) 13, xerographic remote (XER) 15, and recirculating document handler remote (RDHR) 17. PHR 11, MIR 13, XER 15, RDHR 17, and CPM 19 are communicated with one another by means of a shared communication line (SCL) 25 through which control instructions and synchronizing clock pulse signals from and to the machine remotes pass. As will be understood, certain of the remotes, i.e. FOR 9, are not essential to operation of reproduction machine 5 and in the event of a failure of a remote of this type, operation of machine 5, albeit restricted in the inability to use the failed remote, may nevertheless be permitted. Other remotes such as PHR 11 are critical, any failure of a remote of this type precludes further operation of reproduction machine 5.

Figure 5:
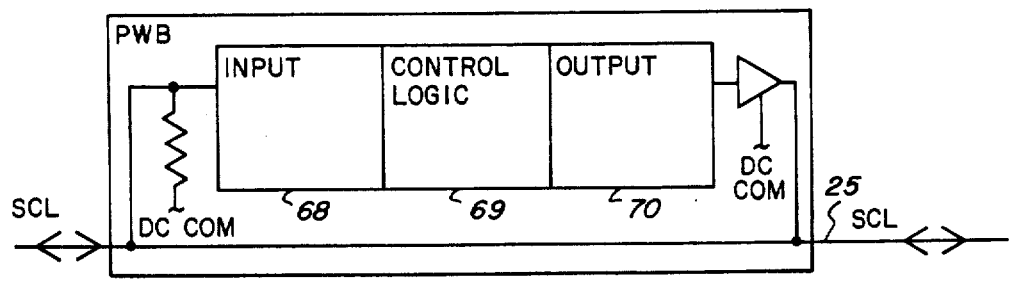
FIG. 5 is a view illustrating the coupling arrangement of the shared communication line with the machine control modules.

Referring to FIG. 5, the ends of SCL 25 are terminated with resistors (not shown) which establish a predetermined base bias on SCL 25 (i.e. +4 v. DC). CPM 19 and each remote 7, 8, 9, 11, 13, 15, 17 includes an input section or receiver 68 which detects and forwards messages on SCL 25 addressed to the particular controller module to the module control operating logic 69.

and an output section or transmitter 70 which places messages from the controller modules onto SCL 25.

Figure 3:
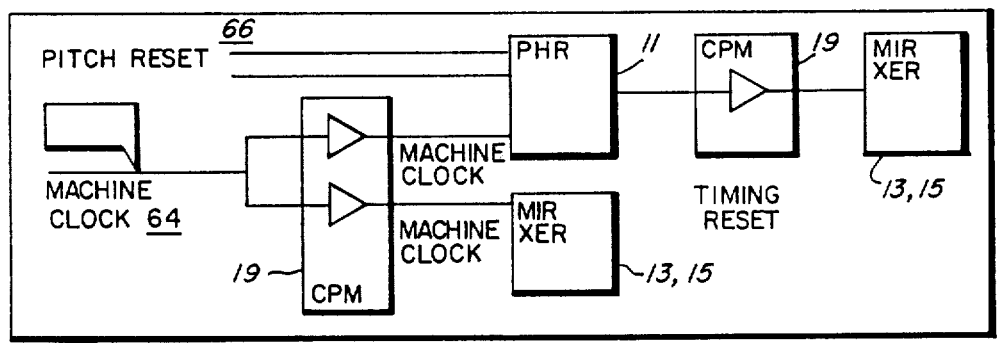
FIG. 3 is a schematic view illustrating the distribution of timing signals between the control modules for the machine shown in FIG. 1.
Figure 4:
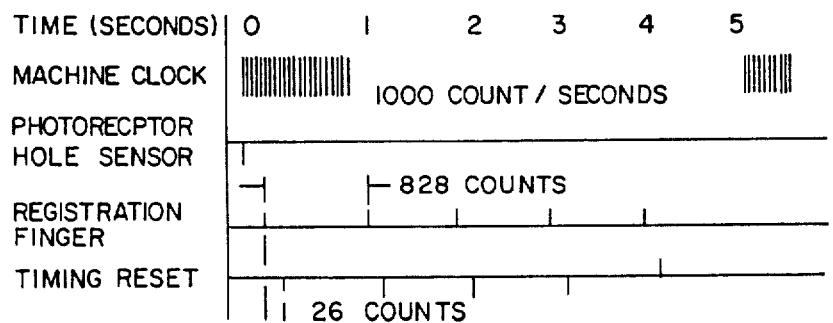
FIG. 4 is a timing chart illustrating machine timing sequences.

Referring particularly to FIGS. 1, 3, and 4, a suitable machine clock pulse generator 64, which is drivingly coupled to the output shaft of main drive motor 29, generates a succession of clock pulses whenever drive motor 29 is energized. As will be understood, to enhance copy throughput, several copy sheets may be in process at various locations along paper path 35 at any one time. To accommodate this and permit individual copies to be tracked and processed in the particular manner desired, timing control over the copy processing functions is divided into pitches, each pitch being further subdivided into a number of machine clock pulses. For example, paper path 35 may be separated into seven pitches with each pitch being composed of approximately 1,000 machine clock pulses.

Pitch reset signals, which serve in effect to determine the length of the pitch and the number of machine clock pulses within the pitch, are derived from copy sheet registration finger 67. For this purpose, cooperating light and photosensor 65, 66 respectively are disposed opposite each other on each side of registration finger 67. As a result, each revolution of finger 67 between lamp 65 and photosensor 66 interrupts the beam of light emitted by lamp 65 to cause photosensor 66 to output a reset pulse. The output of machine clock pulses by generator 64 are input through CPM 19 to PHR 11 while the pitch reset signals generated by photosensor 66 are input directly to PHR 11.

Referring now to FIG. 1, to monitor and control movement and processing of the copy sheets moving along paper path 35, a series of jam sensors 63 which may for example comprise switches, are disposed at predetermined positions along the paper path. To enable the user or operator of reproduction machine 5 to control the machine and program the copy run desired, a suitable operator control panel 45 with display 46 is provided at some convenient location on machine 5. The copy run instructions programmed by control panel 45 are input to CPM 19 where a copy information byte for each copy to be made is generated.

Figure 6:
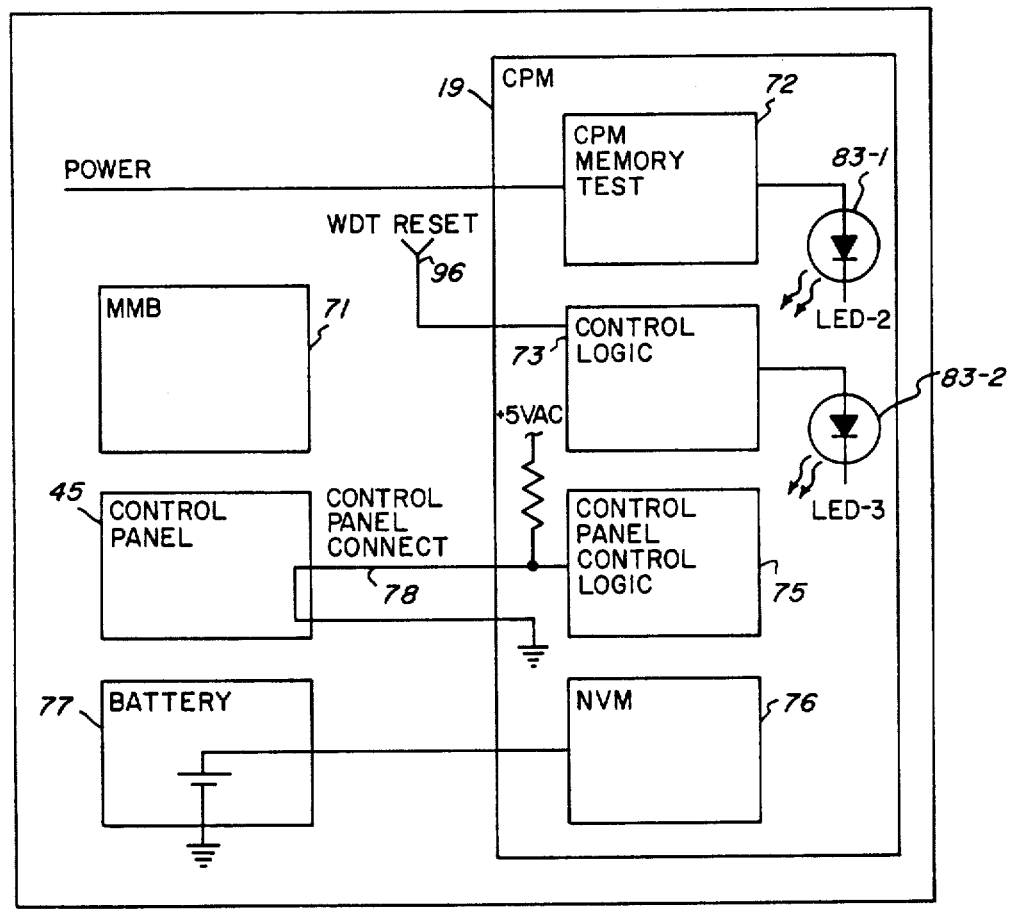
FIG. 6 is a schematic view showing the principal components of the Central Processing Master (CPM) and the interrelationship with the machine Main Memory Board (MMB) and control panel.

Referring to FIG. 6, reproduction machine 5 includes a main memory board or MMB 71 where the basic machine operating program is stored. MMB 71 is normally composed entirely of Read Only Memory or ROM. MMB 71 is accessed or read by the control logic section 73 of CPM 19. CPM 19 itself has a memory section 72 which includes both ROM and Random Access Memory or RAM together with Non-Volatile Memory or NVM section 75. Control logic section 73 of CPM 19 includes suitable time out logic (termed a Watch Dog Timer or WDT herein) which requires periodic resetting within a predetermined timed interval. Failure to reset the WDT within the aforementioned interval indicates a system malfunction and the WDT, on timing out, inhibits further operation. WDT reset line 96 provides a reset input to the WDT as will appear. Remotes 9, 11, 13, 15, and 17 also include on board memory sections (not shown) which may comprise any one or all of the foregoing ROM, RAM, or NVM memory types.

As will be understood by those skilled in the art, a ROM device is a digital memory circuit designed to contain permanent information, the name Read Only Memory meaning that information can only be read from the ROM by control logic section 73. ROM memory, once established, cannot be changed or written into.

A RAM device is a digital memory circuit that temporarily stores information. RAM memory may either be read or written into. When power is lost as where reproduction machine 5 is switched off, information in RAM memory is lost.

NVM memory is a RAM device which will store or retain information so long as a DC voltage is applied. For this reason, a battery 77 is provided to retain DC power to the NVM when the reproduction machine 5 is switched off. CPM 19 interfaces with remotes 7, 8, 9, 11, 13, 15, and 17 through SCL 25 as described. CPM additionally interfaces with control panel 45 and display 46 thereof through a suitable connector which for example may comprise a multiple line flat cable 78. Where cable 78 is connected properly, a signal at a predetermined logic level (i.e. a binary 0) is input to CPM 19.

When power is first applied to reproduction machine 5, various self tests are carried out to verify the operability of the electronics and logic of reproduction machine 5. The intent of these various self tests is to identify and isolate a failure and communicate the failure and the identify thereof to the operator or user, and to the service personnel. Such communication is initially effected through a special display panel 80 (shown in FIG. 7 and to be hereinafter described) on CPM 19 and thereafter, when the integrity of the cable 78 between CPM 19 and control panel 45 has been established, by means of status codes displayed on display 46 of control panel 45. Other display arrangements of course may be envisioned.

Figure 7:
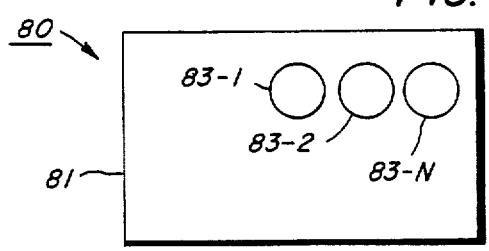
FIG. 7 is a view showing details of the CPM fault display panel.

Referring to FIG. 7, CPM display panel 80 is conveniently located on a CPM printed wiring board or PWB 81. CPM display panel 80 includes plural lamps 83-1, 83-2, ... 83-N, which may for example comprise LEDs, to indicate through selective energization or deenergization thereof the operating status of certain of the electronic portions of CPM 19, and particularly the operating status prior to testing and establishing the operability of the communication cable 78 between CPM 19 and control panel 45.

The self tests referred to herein are automatic processes that are conducted at the time the reproduction machine power on/off switch 47 is switched on to prepare the machine for copying. It will be understood, however, that self tests may additionally be conducted at any other suitable time as for example, following clearing of a fault. The various self tests herein may be subdivided into three major segments, the first being the CPM 19 and MMB 71 tests, the second the remote (i.e. DCR 7, FSR 8, FOR 9, PHR 11, MIR 13, etc.) tests, and the third the SCL 25 communication tests. The foregoing tests or checks are run one after the other with successful completion of one test being required prior to initiation of the next test. As will appear, CPM 19 initiates the remote self tests following successful completion of the memory core portion of the CPM self tests, by outputting a reset signal (RESET) to the remotes DCR 7, FSR 8, FOR 9, PHR 11, MIR 13, XER 15, and RDHR 17.

TEST EXAMPLES

In order to test NVM battery 77 and NVM 75 itself, certain control information is written by CPM 19 into NVM 75 some point in time, i.e. at the time reproduction machine 5 is manufactured. When power on/off switch 47 is switched on, the machine low voltage power supply 41 provides power to NVM 75 and is used to charge battery 77. When reproduction machine 5 is switched off, battery 77 is relied on to hold the contents of NVM 75. During the CPM self test, information in the memory section 72 of CPM 19 is compared with the control information stored earlier in NVM 75. If the two memories do not match, a battery fault is declared and identified by a predetermined status code on display 46 of control panel 45. A test of the NVM memory integrity is also run, the CPM writing information into NVM 75, then reading the information back and comparing the information from the NVM 75 with the information originally read in.

Self tests conducted by the individual remotes preferably comprise checks for a fault in the remote processor 69, the input section 68 and the output section 70. A remote processor fault is declared when communication between a remote and the CPM 19 cannot be established.

Figure 8:
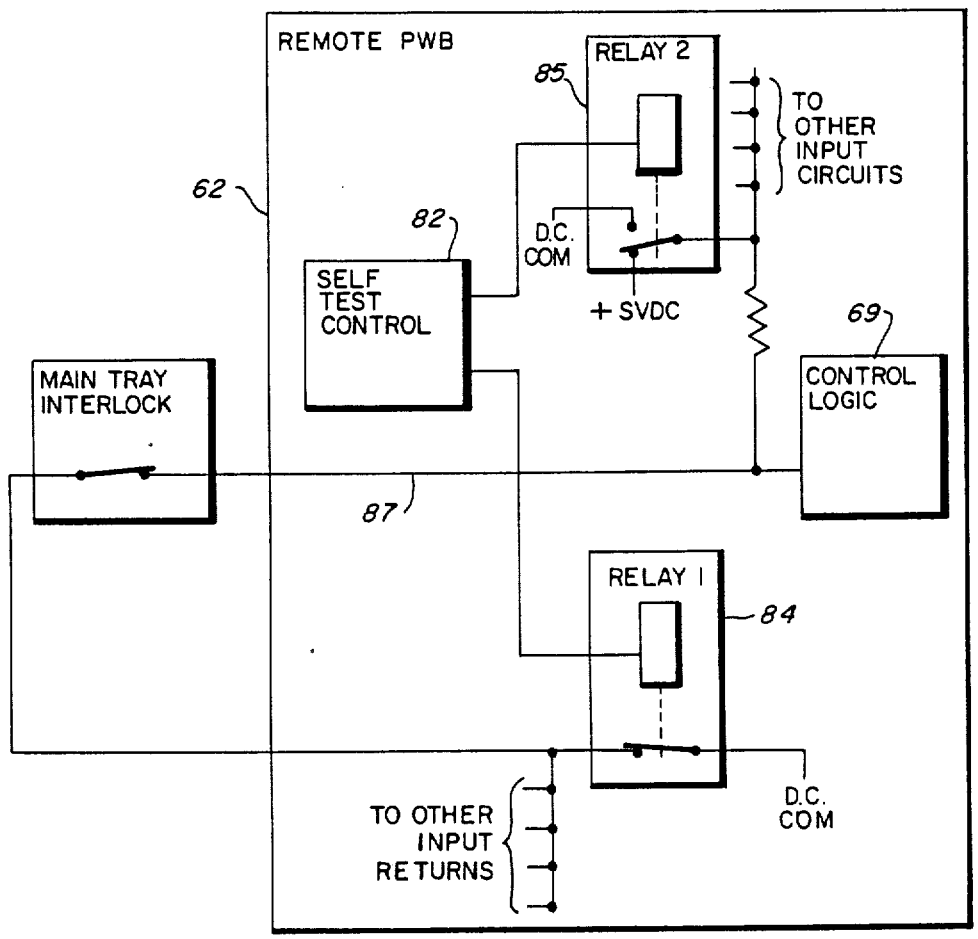
FIG. 8 is a schematic view of the input self test circuitry for the control modules.

Referring to FIG. 8, each remote input section 68 includes a relay operated switch pair 84, 85 across the DC common line 87 from low voltage power supply 41 to the remote's control logic 69. For testing, self test control 82 energizes relay switch 84 to interrupt line 87 while relay switch 85 is momentarily energized to cause the input to control logic 69 to drop from the preset low voltage power supply level to zero and back again. If the remote control logic 69 fails to sense the resulting voltage pulse, a remote input section fault is generated.

Figure 9:
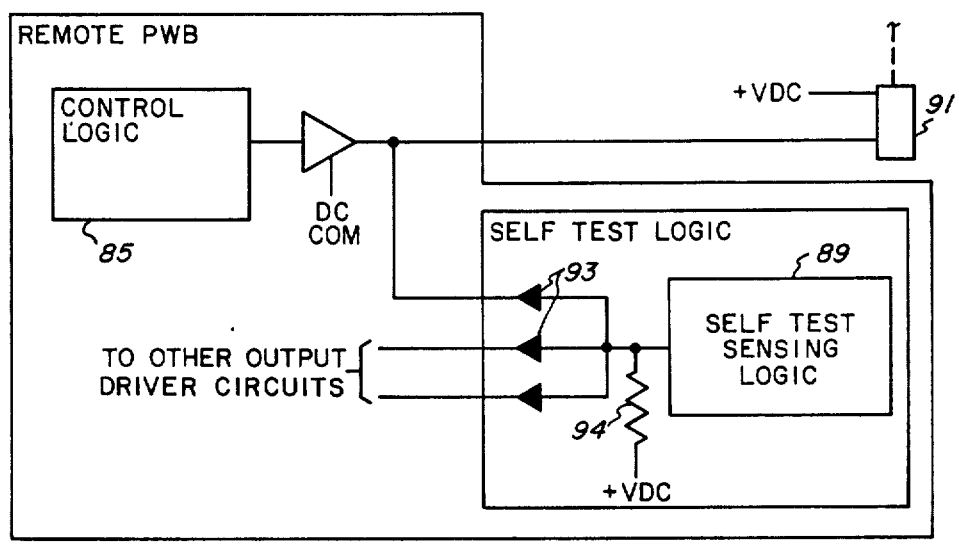
FIG. 9 is a schematic view of the output self test circuitry for the control modules.
Figure 10A:
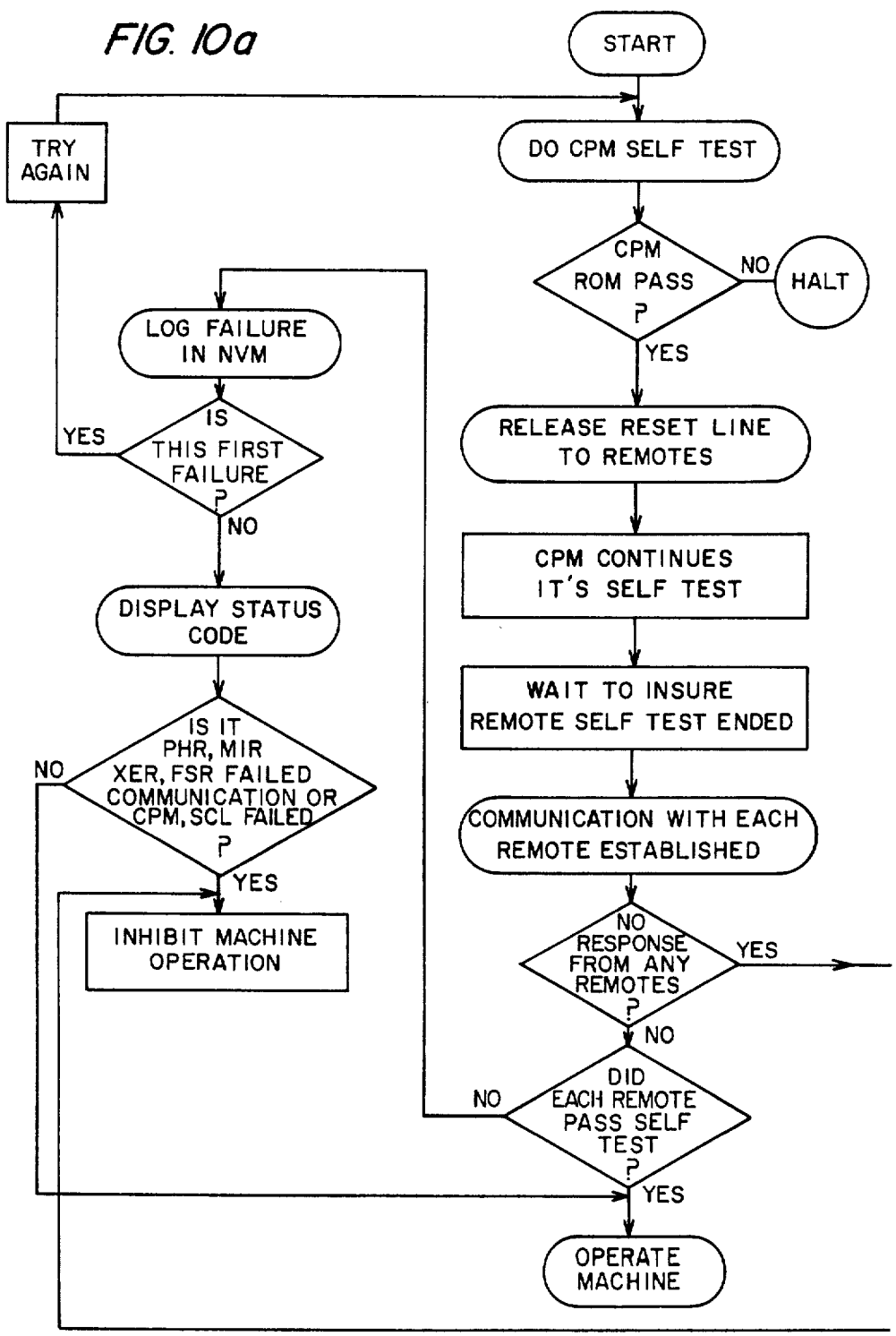

Referring to FIG. 9, self test control 89 is coupled to the reproduction machine output drivers serviced by the remote such as solenoid 91. With all drivers off, self test control 89 samples the DC operating voltage for the drivers which is high. If a driver is switched on, the DC operating voltage goes low through diode 93 and resistor 94.

At start of the test, control 89 looks to see if all drivers are off, that is, is the driver operating voltage high. Then, each driver, such as solenoid 91 is switched on and off in succession while control 89 monitors the operation. If one or more of the output drivers do not switch on, a remote output section fault is detected. In conducting these tests, the various output drivers such as solenoid 91 are only switched on momentarily, the interval being insufficient to actuate the driver.

Tables I-XII disclose software routines for performing the aforedescribed self tests of CPM 19, MMB 71, and remotes 7, 8, 9, 11, 13, 15, and 17 as well as a communication check between CPM 19 and the various remotes. More specifically, Table I provides the self test routines for the CPM memory 72 (i.e. "perform CPM ROM Check Sum" test, etc.), MMB 71 ("perform MMB Rom Check Sum" test), the cable 78 between CPM 19 and control panel 45 (i.e. "perform control panel connection test"), and NVM 75/battery 77 (i.e. "perform NVM storage test", etc.), and for enabling self testing of the remotes 7, 8, 9, 11, 13, 15 and 17 (i.e. "Start SADH, SOR 1, SOR 2, RDH for Power Up Self Test", etc.). Tables II, III, and IV give the routines for testing the remotes, i.e. DCR 7 Self Test (Table II), RDH, SADH 17 Self Tests (Table III), and PHR 11, MIR 13, etc. Self Tests (Table IV).

Following successful completion of the CPM and remote's self tests, shared line communication (SLC) tests are run to determine whether or not communication has been established via SCL 25 between CPM 19 and the remotes 7, 8, 9, 11, 13, 15 and 17 (Tables V, VI, VII, VIII). Table V provides routines for checking communication with each remote (i.e. "Check for DCR communication", etc.) while Tables VI, VII and VIII provide routines for setting fault flags and declaring any communication fault in the event communication is not established with the remotes PHR 11, MIR 13 and XER 15 within a predetermined interval (i.e. 200 milliseconds) or with DCR 7, FSR 8, FOR 9 or SADH or RDH 17.

Table IX provides the routine for determining whether or not the failure to communicate is the fault of CPM 19 or of SCL 25. This is effected by having PHR 11 attempt to communicate with MIR 13 and setting the WDT line 96 high in the event the attempted communication is successful indicating a CPM 19 fault or setting line 96 low in the event the attempted communication is not successful indicating an SCL 25 fault.

Table X provides the routine for logging in NVM 75 any failure while Table XI provides the routine for retrying the tests if the previous failure was the first. Where a previous failure in the self test routines has occurred, no retry is permitted. Table XII provides the routine for disabling the reproduction machine 5 in the event one of the FSR 8, PHR 11, MIR 13, XER 15, CPM 19 or SCL 25 has failed by diabling the low voltage power supply 41 to the machine (i.e. mask 24 v) or permitting restricted operation of reproduction machine 5 in the event one of FOR 9 or RDHR 17 is at fault.

OPERATION

Referring particularly to FIGS. 6-10, and Table I, the integrity of the CPM memory section 72 is first checked by suitable memory tests such as summing the memory contents and comparing such sum with a known amount or check sum. If this test is successful, lamp 83-1 (LED 2) is lit. If the CPM memory section fails the test, lamp 83-1 remains off indicating the failure.

Passage of the CPM memory self test enables testing of the CPM control logic 73 and main memory board (MMB) 71. If these tests are passed successfully, lamp 83-2 on CPM display panel 80 is lit. If failed, lamp 83-2 remains off identifying the failure to the operator.

The integrity of interface cable 78 between CPM 19 and control panel 45 is next tested. Failure of this test causes lamp 83-2 (LED 3) of CPM display panel 80 to flash to identify the failure. NVM 75 is next tested to verify the integrity of memory 75 and the operability of battery 77.

With communication between CPM 19 and control panel 45 (and display panel 46 thereof) established, further test failures may be identified by status codes displayed on panel 46.

On successfully completing testing of the CPM memory section 72, CPM 19 outputs a reset signal to DCR 7, FSR 8, FOR 9, PHR 11, MIR 13, XER 15, and RDHR 17 enabling the remotes 7, 8, 9, 11, 13, 15, 17 to commence the individual remote self test routines as described in Tables II, III and IV. As will be understood, the various remote self test routines may be stored in memory on the remote itself or alternately, one or more of the remote self test routines may be stored at an outside memory location and communicated to the remote during the self test program through SCL 25. While the remotes 7, 8, 9, 11, 13, 15, 17 are conducting individual self tests, additional self test routines are carried out by CPM 19.

On completion of the last self test routine, CPM 19 attempts to poll each remote in sequence through SCL 25 to determine if a remote failed any self test routine (Tables V, VI, VII, VIII). If communication with each of the remotes is successfully established and polling of the remotes indicates that no failure occurred, reproduction machine 5 is enabled for operation.

In the event a test failure either in CPM 19 or one of the remotes 9, 11, 13, 15, or 17 occurred, or communication with one or more of remotes is not established by CPM 19, the failure is identified and logged in NVM 75 to provide a permanent record (Table X). The re-try routine (Table XI) is entered, and if the failure is identified as a first failure, self testing is resumed starting with the first self test routine.

If the failure is a second failure, operation of reproduction machine 5 is either prevented or restricted depending upon the fault. Where CPM 19 fails to communicate with any remote, following a delay, PHR 11 attempts to communicate with MIR 13 (Table IX). If PHR 11 successfully communicates with MIR 13, PHR 11 sets WDT line 96 high (i.e. a binary 1). If PHR 11 fails to communicate with MIR 13, WDT line 96 is set low (i.e. a binary 0). Following a delay, CPM 19 interrogates WDT line 96. Where line 96 is low, SCL 25 has failed. Where WDT line 96 is high, CPM has failed.

The specific failure in either SCL 25 or CPM 19 is logged in NVM 75. If the failure occurred for the first time, the self test cycle is restarted at the beginning and progresses in the manner described heretofore. If the failure is a second failure, operation of reproduction machine 5 is prevented and the failure displayed in the manner described.

While the invention has been described with reference to the structures disclosed, it is not confined to the details set forth, but is intended to cover such modifications or changes as may come within the scope of the following claims.

TABLE I

PERFORM CPM POWER-ON SELF TEST

| REF PAGE | | | |
|---|---|---|---|
| | * | 1 | RESET ALL REMOTES AND DISABLE INTERRUPTS |
| | * | 2 | CLEAR ALL OUTPUT IN CPM |
| 8 | * | 3 | PERFORM CPM ROM CHECK SUM |
| | * | 4 | if CPM ROM FAIL |
| | * | 5 | HALT |
| | * | 6 | endif |
| | * | 7 | (START) |
| 57 | * | 8 | SADH,SOR1,SOR2,RDH,FOR POWER UP SELF TEST |
| 53 | * | 9 | DCR POWER UP SELF TEST |
| | * | 10 | PHR,MIR,XER,FSR SELF TEST |
| | * | 11 | .. |
| 15 | * | 12 | PERFORM PINGPONG RAM TEST |
| | * | 13 | if RAM FAIL |
| | * | 14 | RESET ALL REMOTES |
| | * | 15 | HALT |
| | * | 16 | endif |
| | * | 17 | .. |
| 34 | * | 18 | PERFORM TIMER/INTERRUPT TEST |
| | * | 19 | if TIMER/INTERRUPT PASS THE TEST |
| | * | 20 | TURN ON LED2 |
| | * | 21 | else |
| | * | 22 | RESET ALL REMOTES |
| | * | 23 | HALT |
| | * | 24 | endif |
| | * | 25 | .. |
| 9 | * | 26 | PERFORM MMB ROM CHECK SUM |
| | * | 27 | if MMB ROM PASS THE CHECK SUM TEST |
| | * | 28 | TURN ON CPM LED2, AND TURN ON CPM LED3 |
| | * | 29 | else |
| | * | 30 | RESET ALL REMOTES |
| | * | 31 | HALT |
| | * | 32 | endif |
| | * | 33 | .. |
| | * | 34 | PERFORM CONTROL PANEL CONNECTION TEST |
| | * | 35 | if CONNECTION IS FAIL |
| | * | 36 | RESET ALL REMOTES |
| | * | 37 | BLINKING LED2 |
| | * | 38 | endif |
| | * | 39 | .. |
| 22 | * | 40 | PERFORM NVM STORAGE TEST |
| 23 | * | 41 | PERFORM NVM FUNCTIONAL TEST |
| | * | 42 | if NVM FAIL FUNCTIONAL TEST |
| | * | 43 | DISPLAY NVM FAILURE STATUS CODE ON 7-SEGMENT |
| | * | 44 | STOP TEST |
| | * | 45 | elseif NVM FAIL STORAGE TEST |
| | * | 46 | DISPLAY BATTERY FAILURE STATUS CODE ON 7-SEGMENT |
| | * | 47 | STOP TEST |
| | * | 48 | endif |

```
 * 49     ..
 * 50     PERFORM BILLING BREAK POINT TEST
 * 51     if BILLING IS FAIL
 * 52         STORE BILLING FAILURE IN NVM
 * 53     endif
 *
```

LEGEND:

NVM: Non Volatile Memory
MMB: Main Memory Board
LED 2: lamp 83-1
LED 3: lamp 83-2

TABLE II

```
     DCR POWER UP SELF TEST

REF
PAGE  ********************************************
      *
      *  1     CLEAR ALL DCR OUTPUT
      *  2     RESET AND RELEASE VFD
 54   *  3     PERFORM VFD POWER UP SELF TEST
      *  4     PERFORM CONTROL ROM CHECK SUM TEST
      *  5     if DCR FAIL CONTROL ROM CHECK SUM TEST
      *  6         RESET VFD AND HALT
      *  7     endif
      *  8     .....
      *  9     PERFORM DCR RAM TEST
      * 10     if DCR FAIL RAM TEST
      * 11         RESET VFD AND HALT
      * 12     endif
      * 13     .....
      * 14     TURN DIAGNOSTIC LED1 ON
      * 15     PERFORM VFD COMMUNICATION TEST
      * 16     if DCR FAIL COMMUNICATION TEST
      * 17         BLINK DIAGNOSTIC LED1
      * 18     endif
      * 19     .....
      * 20     PERFORM LANGUAGE ROM ONE CHECK SUM TEST
      * 21     if LANGUAGE ROM ONE CHECK SUM TEST FAIL
      * 22         LOG FAILURE TO RAM
      * 23     endif
      * 24     ........
      * 25     PERFORM LANGUAGE ROM TWO CHECK SUM TEST
      * 26     if LANGUAGE ROM TWO CHECK SUM TEST FAIL
      * 27         LOG FAILURE TO RAM
      * 28     endif
      * 29     ........
      * 30     if BOTH LANGUAGE CHECK SUM ARE GOOD
      * 31         TURN DIAGNOSTIC LED1 AND LED2 ON
      * 32     endif
      * 33     ...
 40   * 34     PERFORM POWER UP SLC TEST
      *
      ********************************************
```

LEGEND:

VFD: Vacuum Fluorescent Display 46
SLC: Shared Line Check (check of SCL 25)
LED 1: lamp 83-n

TABLE II (pg. 2)

```
DCR SELF TEST

PERFORM VFD POWER UP SELF TEST

REF
PAGE  ********************************************
       *
       *  1   PERFORM INTERNAL RAM CHECK
       *  2   if INTERNAL RAM FAILURE
       *  3       HALT
       *  4   endif
       *  5   .....
       *  6   PERFORM ROM CHECK SUM
       *  7   if ROM CHECK SUM IS BAD
       *  8       HALT
       *  9   endif
       * 10   .....
       * 11   PERFORM POWER CONVERTER TEST
       * 12   if NO POWER
       * 13       HALT
       * 14   endif
       * 15   .....
       * 16   PERFORM TIMER INTERRUPT TEST
       * 17   if NO INTERRUPT
       * 18       HALT
       * 19   endif
       * 20   .....
       * 21   PERFORM DCR COMMUNICATION TEST
       * 22   if CAN NOT COMMUNICATED
       * 23       KEEP TRYING
       * 24   endif
       * 25   .....
       * 26   ACTIVATE OPERATING SYSTEM IN VFD
       *
```

TABLE III

```
SADH,SOR1,SOR2,RDH SELF TEST

SADH,SOR1,SOR2,RDH,FOR POWER UP SELF TEST

REF
PAGE  ***********************************************************
       *
       *  1   PERFORM SADH,SOR1,SOR2,RDH,FOR ROM CHECK SUM
       *  2   if SADH,SOR1,SOR2,RDH,FOR FAILS THE CHECK SUM TEST
       *  3       HALT
       *  4   endif
       *  5   ..
  15   *  6   PERFORM PINGPONG RAM TEST
       *  7   if SADH,SOR1,SOR2,RDH,FOR FAILS RAM TEST
       *  8       HALT
       *  9   endif
       * 10   ..
  34   * 11   PERFORM TIMER/INTERRUPT TEST
       * 12   if SADH,SOR1,SOR2,RDH,FOR FAILS TIMER/INTERRUPT TEST
       * 13       HALT
       * 14   endif
       * 15   ..
  62   * 16   PERFORM SADH,SOR1,SOR2,RDH,FOR INPUT TURN AROUND TEST
       * 17   if SADH,SOR1,SOR2,RDH,FOR FAILS INPUT TEST
       * 18       LOG FAILURE IN RAM AND DECLARE AT SHARE LINE CHECK
       * 19   endif
       * 20   ..
  67   * 21   PERFORM SADH,SOR1,SOR2,RDH,FOR OUTPUT TURN AROUND TEST
       * 22   if SADH,SOR1,SOR2,RDH,FOR FAILS OUTPUT TEST
       * 23       LOG FAILURE IN RAM AND DECLARE AT SHARE LINE CHECK
       * 24   endif
```

```
      * 25
40  * 26     PERFORM POWER UP SLC TEST
      * 27
      * 28
      * 29
43  * 30     PERFORM BACKGROUND SLC TEST
      * 31    PERFORM RUN-TIME INTERRUPT TEST
      *
      ..........................................................
```

LEGEND:

SCL: Share Line Check (of SCL 25)

TABLE III (pg. 2)

```
        PERFORM SADH,SORT,SOR2,RDH,FOR INPUT TURN AROUND TEST

REF
PAGE  ***********************************************************
      *
      *  1    SET THE OUTPUT BIT XXX$TAH HIGH
      *  2    ..THUS TURN ON THE REED RELAY, AND BREAK GROUND TO ALL INPUT DEVICES
      *  3    SET THE OUTPUT BIT XXX$TAL LOW
      *  4    CHECK THE INPUTS LISTED IN THE INPUT TEST DICTIONARY FOR '1'
      *  5    if ANY INPUT BIT IS '0'
      *  6        HALT
      *  7        LOG INPUT FAILURE
      *  8    endif
      *  9    SET THE OUTPUT BIT XXX$TAL HIGH
      * 10    CHECK THE INPUT BITS TO BE '0'
      * 11    if ANY INPUT BIT IS '1'
      * 12        LOG INPUT FAILURE
      * 13    endif
      * 14    SET THE OUTPUT BIT XXX$TAH LOW
      * 15    ..THUS TURN OFF THE REED RELAY, AND RECONNECT GROUND TO ALL INPUT
      *
```

LEGEND:

TAH: Turn Around High
TAL: Turn Around Low
Reed Relay: Relay 84 (Fig. 8)

```
        PERFORM SADH,SORT,SOR2,RDH,FOR OUTPUT TURN AROUND TEST

REF
PAGE  ***********************************************************
      *
      *  1    do FOR ALL OUTPUT LISTED IN THE OUTPUT DATA DECLARATION
      *  2        TURN THE OUTPUT ON, ONE A TIME
      *  3        CHECK THE INPUT OUT#TAXXX FOR '0'
      *  4        if OUT#TAXXX IS NOT '0'
      *  5            TURN THE OUTPUT OFF
      *  6            LOG OUTPUT FAILURE
      *  7        endif
      *  8        TURN THE OUTPUT OFF
      *  9        CHECK OUT#TAXXX FOR '1'
      * 10        if OUT#TAXXX IS NOT '1'
      * 11            LOG OUTPUT FAILURE
      * 12        endif
      * 13    enddo
      * 14    return
      *
```

LEGEND:

TAX: Turn Around RDH, FOR, etc.

TABLE IV

PHR POWER UP SELF TEST

```
REF
PAGE ***********************************************
       *
       *   1    PERFORM PHR ROM CHECK SUM
       *   2    IF PHR FAILS THE CHECK SUM TEST
       *   3        HALT
       *   4    ENDIF
       *   5    ..
576  * 6       PERFORM PINGPONG RAM TEST
       *   7    IF PHR FAILS RAM TEST
       *   8        HALT
       *   9    ENDIF
       *  10    ..
596  * 11      PERFORM TIMER/INTERRUPT TEST
       *  12    IF PHR FAILS TIMER/INTERRUPT TEST
       *  13        HALT
       *  14    ENDIF
       *  15    ..
637  * 16      PERFORM PHR INPUT TURN AROUND TEST
       *  17    IF PHR FAILS INPUT TEST
       *  18        HALT
       *  19    ENDIF
       *  20    ..
639  * 21      PERFORM PHR OUTPUT TURN AROUND TEST
       *  22    IF PHR FAILS OUTPUT TEST
       *  23        HALT
       *  24    ENDIF
       *  25    ..
602  * 26      PERFORM POWER UP SLC TEST
       *  27    .
       *  28    .
       *  29    .
606  * 30      PERFORM BACKGROUND SLC TEST
616  * 31      PERFORM RUN-TIME INTERRUPT TEST
       *
```

TABLE IV (pg. 2)

MIR POWER UP SELF TEST

```
REF
PAGE ***********************************************
       *
       *   1    PERFORM MIR ROM CHECK SUM
       *   2    IF MIR FAILS THE CHECK SUM TEST
       *   3        HALT
       *   4    ENDIF
       *   5    ..
576  * 6       PERFORM PINGPONG RAM TEST
       *   7    IF MIR FAILS RAM TEST
       *   8        HALT
       *   9    ENDIF
       *  10    ..
596  * 11      PERFORM TIMER/INTERRUPT TEST
       *  12    IF MIR FAILS TIMER/INTERRUPT TEST
       *  13        HALT
       *  14    ENDIF
       *  15    ..
642  * 16      PERFORM MIR INPUT TURN AROUND TEST
       *  17    IF MIR FAILS INPUT TEST
       *  18        HALT
       *  19    ENDIF
       *  20    ..
644  * 21      PERFORM MIR OUTPUT TURN AROUND TEST
       *  22    IF MIR FAILS OUTPUT TEST
       *  23        HALT
       *  24    ENDIF
       *  25    ..
602  * 26      PERFORM POWER UP SLC TEST
       *  27    .
       *  28    .
       *  29    .
606  * 30      PERFORM BACKGROUND SLC TEST
616  * 31      PERFORM RUN-TIME INTERRUPT TEST
       *
```

TABLE IV (pg. 3)

```
          XER POWER UP SELF TEST

REF
PAGE  ************************************************
      *
      *  1    PERFORM XER ROM CHECK SUM
      *  2    IF XER FAILS THE CHECK SUM TEST
      *  3        HALT
      *  4    ENDIF
      *  5    ..
576   *  6    PERFORM PINGPONG RAM TEST
      *  7    IF XER FAILS RAM TEST
      *  8        HALT
      *  9    ENDIF
      * 10    ..
596   * 11    PERFORM TIMER/INTERRUPT TEST
      * 12    IF XER FAILS TIMER/INTERRUPT TEST
      * 13        HALT
      * 14    ENDIF
      * 15    ..
657   * 16    PERFORM XER OUTPUT TURN AROUND TEST
      * 17    IF XER FAILS OUTPUT TEST
      * 18        HALT
      * 19    ENDIF
      * 20    ..
602   * 21    PERFORM POWER UP SLC TEST
      * 22    .
      * 23    .
      * 24    .
606   * 25    PERFORM BACKGROUND SLC TEST
616   * 26    PERFORM RUN-TIME INTERRUPT TEST
      *
```

TABLE V

SLC_TEST

```
******************************************************************************
*                                                                              *
*    B E G I N N I N G   O F   C O M M U N I C A T E   C H E C K               *
*                                                                              *
*                                                                              *
*  THIS IS THE BEGINNING OF COMMICATION CHECK, ALL CRASH FLAG ARE CLEAR.       *
*                                                                              *
*  THE ALL@FAIL FLAG IS USE TO CHECK FOR CPM@FAULT OR SHARF@LINE@AULT IS       *
*  INITIALIZE TO US MACHINE WITH SADH AND TWO SORTER.                          *
*  THE BITS IN THIS FLAG WILL BE CLEAR OR SET LATER IF THIS IS NOT A US WITH*
*  SADH AND TWO SORTERS.                                                       *
*  ALL INITIAL COMMUNICATION OR TO FAILURE FALLTS WILL BE CLEAR IN THIS        *
*  SECTION.                                                                    *
*                                                                              *
*  SOME FLAGS USE IN THE COMMUNICATION CHECK ARE:                              *
*                                                                              *
*  COMMUNICATE@CHK:                                                            *
*  ********************************************************                    *
*  * DCR  * SOR2 * SOR1 * SADH * FSR  * XER  * MIR  * PHR  *                   *
*  *      *      * FOR  * RDH  *      *      *      *      *                   *
*  ********************************************************                    *
*   BIT 7  BIT 6  BIT 5  BIT 4  BIT 3  BIT 2  BIT 1  BIT 0                     *
*                                                                              *
*  DECISION@FLAG : FOR RETRY AND ENABLE OR DISABLE 24 VOLTS                    *
*                                                                              *
*  ********************************************************                    *
*  * DONT * OUNT *SOSIO *SOSMEM* DONT * CONT * IOPTO*IOPMEM*                   *
*  * CARF * CARE * FAIL * FATL * CARF * CARE * FAIL * FATL *                   *
*  ********************************************************                    *
*   BIT 7  BIT 6  BIT 5  BIT 4  BIT 3  BIT 2  BIT 1  BIT 0                     *
*  BIT 1 WILL BE CLEAR IF THE TO@FLT@PASS IS SET                               *
*  IF BIT 0 OR 1 IS SET, ALL REMOTES AND IOPS WILL BE HELD RESET               *
*                                                                              *
```

```
* IO&CONFIG:SAME AS IN@OUT@CONFIG BUT THIS IS USE BY ALL PROCEDURES
* ****************************************************************
* * FSR  * SOR2 * SOR1 * FINI * STACK* CFF  * SADH * RDH  *
* ****************************************************************
*   BIT 7  BIT 6  BIT 5  BIT 4   BIT 3  BIT 2  BIT 1  BIT 0
*
*******************************************************************

WAIT 3 SEC:
    JUMP&7&STAT, JUMP&7&FLT, RUN@BIT <- CLEAR:
    ALL&FAIL <- USSADHSOR12:
    IF DCRSWITCH THEN ALL@FAIL <- ALL@FAIL \ DCRFAIL:
```

TABLE V (pg. 2)

```
/*****************************************************************
*
*   C H E C K    F O R    D C R    C O M M U N I C A T I O N
*
*   THE DCR@FLAG IS SET FOR DCR COMMUNICATION CHECK
*
******************************************************************/

IF DCRSWITCH THEN
    BEGIN:
        DCR&FLAG <- 1:
        START DCR_INTERFACE(DIAGNOSTIC,POLLING):
    END:
    /*

/*****************************************************************
*
*   C H E C K    F O R    P H R    C O M M U N I C A T I O N
*
******************************************************************/

START VAR_RACF_SLCPOLL(PHRID,PBITSENSE,PBITPOINTER):
    WAIT 50 MS:
    START PHR_PARAMETER (STATE,RUN,DONTCARE):
    WAIT 200 MS:
    /*

/*****************************************************************
*
*   C H E C K    F O R    S O R    O R    F O R    C O M M U N I C A T I O N
*
******************************************************************/

IF (IN&OUT&CONFIG & OUTPUTCONFIG) !- CLEAR THEN
    START SEND_OUTPUT_REMOTE (POWERUP):
    ELSE ALL&FAIL <- ALL&FAIL & MSKOFFOP:
    /*
```

TABLE V (pg. 3)

```
/**************************************************************
*                                                              *
*   CHECK   FOR   MIR   COMMUNICATION                          *
*                                                              *
**************************************************************/

START VAR_RACE_SLCPOLL(MIRID,MBITSENSF,MBITPOTNTER):
   WAIT 50 MS:
   START MTR_PARAMETER (STATE,RUN,DONTCARE):
   WAIT 200 MS:
   /*

**************************************************************
*                                                              *
*   CHECK   FOR   SADH   OR   RDH   COMMUNICATION              *
*                                                              *
**************************************************************/

IF (IN@OUT@CONFIG & INPUTCONFIG) !- CLEAR THEN
   START SEND_INPUT_REMOTE(POWERUP):
   ELSE ALL@FAIL <- ALL@FAIL & MSKOFFIP :
   /*

**************************************************************
*                                                              *
*   CHECK   FOR   FSR   COMMUNICATION                          *
*                                                              *
**************************************************************/

IF (MARKET@REGION & FXMACHINE) !- CLEAR THEN
   BFGTN:
       FSR@POLL@FLAG <- CLEAR:
       ALL@FAIL <- ALL@FAIL \ FSRBIT:
       START SEND_TO_FSR(INITTALIZEFSR):
   END:

/*

**************************************************************
*                                                              *
*   CHECK   FOR   XER   COMMUNICATION                          *
*                                                              *
**************************************************************/

START VAR_RACE_SLCPOLL(XERID,XBITSENSE,XBITPOINTER):
   WAIT 50 MS:
   START XER_PARAMETER(STATE,RUN,DONTCARE):
   WAIT 200 MS:
```

/*

TABLE VI

```
GLOBAL PROCEDURE VAR_RACE_SLOPULL(REM@ID:BYTE, MACH@STATE: BYTE,
BIT@POINTER:BYTE) :

*****************************************************************
*   DESCRIPTION:   THIS ROUTINE IS USE TO CHECK FOR COMMUNICATION *
*                  BETWEEN CPM AND IOPS (PHR, NIR AND XER).       *
*                  WHEN SLC_TEST START THS PROCEDURE, SLC TEST    *
*                  WILL WAIT 50 MILLISECONDS TO ENSURE THE RACE IS*
*                  SET UP BEFORE IT START TO SET THE IOPS TO RUN  *
*                  MODE (BY START XXX_PARAMETER ROUTINE). WHEN    *
*                  IOPS ARE SET TO RUN MODE, AN INPUT BIT FROM    *
*                  IOPS WILL BE SEND BACK TO CPM.  WITHIN 200     *
*                  MILISEC AND IF THIS ROUTINE IS NOT SEEING THE  *
*                  INPUT TRANSITION.  THIS WILL LOG COMMUNICATION *
*                  FAILURE TO COMMUNICATE@CHECK FLAG.             *
```

```
*           IF COMMUNICATION IS SUCCESSFUL, THIS ROUTINE IS        *
*           ALSO CHECK FOR INPUT OR OUTPUT FAILURE AND             *
*           INCREMENT THE CORRECTED COUNTERS                       *
*                                                                  *
********************************************************************
```

LEGEND:

REM:    Remote
ERRLBL: Error Label
RCLBL:  Remote Clear Label
IOP MEM: Input/Output Memory
INCR:   Increment
SLFTST: Self Test
IOPIO:  Input/Output Processors (i.e. PHR, MIR, XER, FSR)
                Input/Outputs

TABLE VI (pg. 2)

```
ENTER;

REM@FAULT,REM@FAIL@FLAG ← CLEAR;
    LOOPHOLE;
        R CE      TIME  REAL, IMMEDTATE,200,FRRLBL,;
        $EVENT,$NEXT_TIME,($PACKED_BYTE,$DIRECT,REM@ID),;
        MACH@STATE,RCLBL
ERRLBL   :LABEL
        MVI       A,I
        STA       REM@FAIL@FLAG
RCLBL    :LABEL
    END;
    IF REM@FAIL@FLAG THEN
    BEGIN;
        COMMUNICATE@CHR ← COMMUNICATE@CHK \ MASK@ARRAY(BIT@POINTER);
        DECTSTON@FLAG ← DECISION@FLAG \ IOPMEMFAIL;
    END;
    ELSE BEGIN;
        IF REM@FAULT - SET THEN
        BEGIN;
            START INCR_COUMTER(ADDRESS(SLFTST@COUNTER@ARRAY) +
            PACKWURD(D,BIT@POINTER) ;
            START INCR_COUNTER (ADDRESS(TOTAL@SLFTST@FAULT) ;
            DECISION@FLAG ← DECISION@FLAG \ IOPLOFAIL;
        END;
    END;

END;
```

TABLE VI (pg. 3)

```
/***************************************************************
*                                                               *
*    SET   FAILURE   IF   CANNOT   COMMUNICATE                  *
*                                                               *
*         WITH   SOR   OR   FOR                                 *
*                                                               *
****************************************************************/

IF(IN@OUT@CONFIG & OUTPUTCONFIG) != CLEAR THEN
    BEGIN;
        IF ACTIVE(SEND_OUTPUT_REMOTE)THEN
          BEGIN;
             SFT_FAULT_BIT(OUTPUTMFAIL);
             ALL@FAIL <- ALL@FAIL & MSKOEFSUR2;
             CANCEL SEND_OUTPUT_REMOTE;
          END;
        ELSE BLK BEGIN;
             IF (SOS@REM@FAULT = SOR1IOFAIL) \ (SOS@REM@FAULT = FOR1OFAIL)THEN
             LOG_F$ILURE(OUTPUT@SLFTST@CNT);
             IF OUTPUT@ID = FORID THEN
             IO@CONFIG <- IO@CONFIG \ (IN@OUT@CONFIG & SFTFOR);
             ELSE BEGIN;
                 IO@CONFIG <- IO@CONFIG   (IN@OUT@CONFIG & SETSORT);
                 IF (IN@OUT@CONFIG & SETSOR2) != CLEAR THEN
                 BEGIN;
                     IF (OUTPUT@ID & SETSOR2) = CLEAR THEN
                     BEGIN;
                         COMMUNICATE@CHK <- COMMUNICATE@CHK \ SETSOR2;
                         DECISION@FLAG <- DECISION@FLAG \ RETRYBIT1;
                     END;
                     ELSE BEGIN;
                         IF SOS@REM@FAULT = SOR2IOFAIL THEN
                         LOG_FAILURE(SOP2@SLFTST@CNT);
                         IO@CONFIG <- IO@CONFIG \ SETSOR2;
                     END;
                 END;
             END;
        END BLK;
    END;
/*
****************************************************************
*                                                               *
*    SET   FAILURE   BIT   IF   CANNOT                          *
*                                                               *
*    COMMUNICATE   WITH   DCR                                   *
*                                                               *
*    THIS ALSO CLEAR THE DCR@FLAG TO PREVENT ANY ATTEMPT TO COMMUNICATE WITH *
*    DCR REMOTE LATER.  THE DCR WILL BE RESET IF FAIL           *
*                                                               *
****************************************************************/

IF DCRSWITCH THEN
    BEGIN;
        IF ACTIVE(DCR_INTERFACE) THEN
        BEGIN;
            DCR@FLAG <- CLEAR;
            SET FAULT BIT(DCRMEMFAIL);
            CANCEL DCR_INTERFACE;
            DCR$RESET <- RESETDCR;
        END;
    END;
```

TABLE VI (pg. 4)

```
    SET   FAILURE   BIT   IF   CANNOT

COMMUNICATE   WITH   SADH   OR   RDH

IF (IN@OUT@CONFIG & INPUTCONFIG) != CLEAR THEN
    BEGIN;
        IF ACTIVE(SEND_INPUT_REMOTE) THEN
        BEGIN;
```

```
            SET_FAULT_BIT(INPUTMEMFAIL);
            CANCEL SEND_INPUT_REMOTE;
        END;
        ELSE BEGIN;

IF SOS@REM@FAULT ¦ = 0 THEN
            LOG_FAILURE(INPUT@SLFTST@CNT);
            IF INPUT@ID = 1 THEN IO@CONFIG ← IO@CONFIG   (IN@OUT@CONFIG&SETRDH);
            ELSE IO@CONFIG ← IO@CONFIG   (IN@OUT@CONFIG & SETSADHCFF);
        END;
    END;

/*
    ***************************************************************************
    *                                                                         *
    *   S E T   F A I L U R E   B I T   I F   C A N N O T                     *
    *   C O M M U N I C A T E   W I T H   F S R                               *
    *                                                                         *
    ***************************************************************************/

IF (MARKET@REGION & FXMACHINE) ¦= CLEAR THEN
    BEGIN;
        IF FSR@POLL@FLAG = CLEAR THEN
        BEGIN;
            SET_FAULT_BIT(FSRMEMFAIL);
            CANCEL SEND_TO_FSR;
        END;
        ELSE IO@CONFIG ← IN@CONFIG   SETFSR;
    END;
```

TABLE VII

SLC_TEST

```
***************************************************************************
*                                                                         *
*                    S E T   F A U L T   B I T                            *
*                                                                         *
* THIS PROCEDURE WILL SET THE APPROPRIATED FAULT BIT IN THE COMMUNICATE@CHK
* BYTE WHEN THERE IS A COMMUNICATION FAILURE.
* IF FSR FAIL COMMUNICATION, THE DECISION@FLAG WILL BE SET TO DISABLE 24V
* LATER.  OTHERWISE THE RETRY BIT WILL BE SET FOR RETRY LATER.
*
* THIS ROUTINE IS CALLED BY INPUT & OUTPUT REMOTES COMMUNICATION CHECK AND
* FSR, DCR COMMUNICATION CHECK.
*
*
*
***************************************************************************

LOCAL PROCEDURE SET_FAULT_BIT (BIT@POS:BYTE);

ENTER:
        COMMUNICATE@CHK ← COMMUNICATE@CHK   BIT@POS;
        IF BIT@POS = FSRBIT THEN DECISION@FLAG ← DECISION@FLAG \ DISABLF24V;
        ELSE DECISION@FLAG ← DECISION@FLAG \ RETRYBIT];
        RETURN;
    END;
```

TABLE VIII

SLC_TEST

```
/*****************************************************************
*                                                                *
*   D E C L A R E   A L L   C O M M U N I C A T I O N   F A U L T S  *
*                                                                *
*  THIS SECTION WILL DECLARE ALL COMMUNICATION FAILURE LOG TO THE *
*  COMMUNICATE@CHK FLAG, ALSO THE FAILURE COUNTER WILL BE INCREMENTED *
*                                                                *
*****************************************************************/

LOOP INDEX@ ← 0 TO 7:
        IF (COMMUNICATE@CHK & LSBIT) !=CLEAR THEN
        BEGIN:
            LAST@SLFTST@FAULT ← COMM@FAULT@APR(INDEX@ + OFFSET@):
            START DECLARE_FAULT(LAST@SLFTST@FAULT):
            TEMP@ ← INDEX@ + OFFSET@:
            CNTR@ADDRESS ← ADDRESS(SLFTST@COUNNTER@ARRAY):
            INCREMENT_COUNTER(LSB(CNTR@ADDRESS) + TEMP@);
            /*
            INCREMENT_COUNTER(TOTAL@SLFTST@FAULT);
            */
        END:
        COMMUNICATE@CHK ← ROTATE_RIGHT(COMMUNICATE@CHK,1):
    RELOOP:
```

LEGEND:

ARR  : Array
TEMP : Temporary

TABLE IX

```
/*****************************************************************
*                                                                *
*          C P M   O R   S H A R E   L I N E   F A U L T         *
*                                                                *
*  IF CPM CANNOT COMMUNICATE WITH ANY OF THE REMOTES OR IOPS DUE TO EITHER *
*  SLC RECEIVER OR TRANSMITTER BAD OR THE SHARE LINE STUCK AT HIGH OR LOW *
*  THIS WILL WAIT 10 SEC FOR PHR TRYING TO COMMUNICATE WITH MIR. IF COMMUNI *
*  SUCCESSFUL PHR WILL SET THE WDT#CPM HIGH AND CPM FAULT WILL BE DECLARED *
*  OTHERWISE SHARE LINE FAULT WILL BE DECLARED.                  *
*  THESE FAULTS WILL OVERWRITE ALL OTHER COMMUNICATION IN COMMUNICATE@CHK *
*  FLAG.                                                         *
*                                                                *
*****************************************************************/

IF COMMUTICATE@CHK = ALL@FAIL THEN
    BEGIN:
        WAIT 10 SEC:
        IF WDT#CPM = HIGH THEN COMMUNICATE@CHK ← CPMFAILCOMM;
        ELSE COMMUNICATE@CHK ← SLCFAILCOMM;
        OFFSET@ ← 8;
    END:
```

LEGEND:

WDT  : Watch Dog Timer (96, Fig. 6)
COMM : Communication

TABLE X

```
*************************************************************
*                                                           *
*                    L O G   F A I L U R E                  *
*                                                           *
* THIS PROCEDURE IS USE TO LOG FAILURE TO NVM WHEN THERE IS A SOR, FOR, RDH, *
* OR SADH INPUT OR OUTPUT FAILURE.  BOTH THE BOARD FAILURE COUNTER AND THE *
* TOTAL BOARD FAILURE COUNTER IS INCREMENT, ALSO THE DECISION FLAG IS LOG *
* FOR RETRY LATER.                                          *
*                                                           *
*************************************************************/

LOCAL PROCEDURE LOG_FAILURE(FAILURE@ADDRESS:BYTE):
    ENTER:
        START INCREMENT_COUNTER(FAILURE@ADDRESS):
        /*
    START INCREMENT_COUNTER(TOTAL@SLFTST@FAULT):
    */
        DECISION@FLAG <- DECISION@FLAG   SOSTOFLT:
        RETURN:
    END:
LEGEND:

SOS : Remote
```

TABLE XI

SLC_TEST

```
*************************************************************
*                                                           *
*                         RETRY                             *
*                                                           *
* ANY FAILURE DETECTED IN SLC TEST WILL BE TRYING AGAIN.  IF THE SECOND *
* ATTEMPT IS PASSED, NO FAULT WILL BE DECLARE, OTHERWISE THE FAULT WILL *
* BE DECLARED AFTER SECOND TRIED.                           *
*                                                           *
*                                                           *
*************************************************************/

ELSE BEGIN:
        IF DECISION@FLAG != CLEAR THEN
        BEGIN;
            IF DBL@CHK@RSPN = CLEAR THEN
            BEGIN:
                DBL@CHK@RSPN,DIAG@EXIT <- 1;
                JUMP_ZERO;
            END:
        END:
        DBL@CHK@RSPN <- CLEAR
    END:

LEGEND:

DBL CHK RSPN : Double Check Respond
```

TABLE XII

```
                                                           SLC_TEST

/*******************************************************************
*              C O M P L E T E D    S L C    T E S T               *
*    PHR,MIR,XFR,CPM OR SHARE LINE FAILURE WILL DISABLE 24 VOLTS AND NOT  *
*    ALLOW THE TECH REP USING COMPONENT CONTROL.                          *
*    PHR,MIR,XER INPUT OR OUTPUT FAULTS WILL ENABLE 24 VOLTS ONLY IF THE NVM *
*    BYTE IO@FLT@BPASS IS SET.                                            *
*    SADH,ROM,SORTER,FINISHER COMMUNICATION FAULTS WILL MASK OFF THE IO@CONFI *
*    BYTE AND NOT ALLOW ANY ATTEMPT TO COMMUNICATE WITH THESE REMOTES.    *
*    SADH,RDH,SORTER, FINISHER INPUT OR OUTPUT FAULTS WILL ENABLE THE COMMUNIC *
*    WITH THESE REMOTES ONLY IF THE IO@FLT@BPASS IS SET.                  *
*    IF THERE ARE NO IOPS FAULT, SLC TEST WILL START BACKGROUND ROM AND RAM *
*    AND BACKGROUND COMMUNICATION CHECK.                                  *
*                                                                         *
*                                                                         *
*                                                                         *
*******************************************************************/

IF (DECISION@FLAG & MSK24V) != CLEAR THEN
    BEGIN:
        LOOPHOLE:
                   MVI        A,X'40'
                   SIM
        END:
        REM@RESET <- 1;
        START CONSOLE_INPUT;
    END;
    ELSE BEGIN:
        WDT$CPM    <- ON;
        WDT$PHR1   <- ON;
        WAIT 100 MS;
        NO_ACKNOWLEDGEMENT_FLAG <- CLEAR;
        START@POLL@FLAG <- 1;
        REM@RESET <- CLEAR;
        START APP_TASK;
        START BACKGROUND_TEST;
```

What is claimed is:

1. The process of fault checking a reproduction machine having a main controller and plural remote controllers coupled together by a shared communication line through which operating instructions for said machine is transmitted, said machine including display means for visually identifying faults, the steps comprising:
   (a) individually testing the operating integrity of said main controller and said remote controllers;
   (b) polling said remote controllers by establishing communication between said main controller and said remote controllers when testing of all of said controllers is completed to identify to said main controller any failed remote controller;
   (c) when communication by said main controller with said remote controllers cannot be established, attempting to establish communication between at least two of said remote controllers directly with one another to identify whether said communication line or said master controller is at fault;
   (d) repeating testing of said controllers in the event a fault is detected in one of said controllers; and
   (e) inhibiting operation of said reproduction machine in response to said fault being detected a second time in said one controller when testing of said controllers is repeated or when said communication line is identified as having a fault.

2. The process according to claim 1 including the steps of:
   (a) first testing the operating integrity of said main controller memory section; and
   (b) on completing testing of said main controller memory section without failure, commencing testing of said remote controllers.

3. The process according to claim 2 including the step of:
   actuating said display means in response to a main controller memory fault to visually identify said fault.

4. A process for operating a reproduction or printing machine having a plurality of processing stations at least one of which is selectively operable, said machine having a main controller and the plural remote controllers, said controllers being coupled together through a shared communication line over which operating instructions from said main controller to said remote controllers and between said remote controllers are transmitted to operate said machine and produce copies, at least one of said remote controllers being dedicated to controlling said one processing station; the steps comprising:
   (a) initiating a series of self tests on said master controller;
   (b) on successful completion of at least a portion of said master controller self tests, initiating a series of self tests on each of said remote controllers;
   (c) on successful completion of said master controller and said remote controller self tests, polling each of said remote controllers by said master controller to determine if said remote controllers passed said self tests or not;
   (d) where said remote controllers respond when polled by said master controller, identifying any remote controller having a fault to said master controller;
   (e) where none of said remote controllers respond when polled by said master controller, attempting to communicate a first one of said remote controllers directly with a second one of said remote controllers bypassing said master controller;
   (f) where communication is established between said first and second remote controllers, identifying said master controller as having a fault;
   (g) where said one remote controller is identified as having a fault, inhibiting operation of said one processing station while permitting operation of said machine; and
   (h) inhibiting operation of said machine including said one processing station where either said main controller or one of said other remote controllers is identified as having a fault.

5. The process according to claim 4 including the step of identifying said shared communication line as having a fault where communication between said remote controllers is not established, and
   inhibiting operation of said machine including said one processing station where said shared communication line is identified as having a fault.

* * * * *